United States Patent [19]

Kato

[11] Patent Number: 5,545,495
[45] Date of Patent: Aug. 13, 1996

[54] MAGNESIA-BASED BETA ALUMINA SINTERED BODIES AND A PROCESS FOR PRODUCING THE SAME

[75] Inventor: Makoto Kato, Nagoya, Japan

[73] Assignee: NGK Insulators, Ltd., Japan

[21] Appl. No.: 395,526

[22] Filed: Feb. 27, 1995

Related U.S. Application Data

[63] Continuation-in-part of Ser. No. 247,460, May 23, 1994, abandoned, which is a continuation of Ser. No. 925,857, Aug. 7, 1992, abandoned.

[30] Foreign Application Priority Data

| Aug. 12, 1991 | [JP] | Japan | 3-226551 |
| Feb. 2, 1995 | [JP] | Japan | 7-015861 |

[51] Int. Cl.$^6$ ................................................. H01M 10/39
[52] U.S. Cl. .......................................... 429/193; 501/120
[58] Field of Search ............................ 429/193; 501/119, 501/120, 125, 127

[56] References Cited

U.S. PATENT DOCUMENTS

| 3,607,435 | 9/1971 | Charles et al. | 501/127 X |
| 3,707,589 | 12/1972 | Chiku et al. | 501/127 X |
| 3,895,963 | 7/1975 | McGowan et al. | 429/193 X |
| 4,113,928 | 9/1978 | Virkar et al. | 429/193 |
| 4,167,550 | 9/1979 | Duncan | 264/66 |
| 4,339,511 | 7/1982 | Morgan | 429/193 X |
| 5,081,082 | 1/1992 | Hai-Doo et al. | 501/119 X |
| 5,183,610 | 2/1993 | Brog et al. | 501/127 X |
| 5,188,994 | 2/1993 | Ichikawa et al. | 501/122 X |
| 5,229,340 | 7/1993 | Nemoto et al. | 501/119 |
| 5,283,215 | 2/1994 | Hosokawa et al. | 501/120 |

FOREIGN PATENT DOCUMENTS

| 0013833 | 8/1980 | European Pat. Off. |
| 0110712 | 6/1984 | European Pat. Off. |
| 0439949 | 8/1991 | European Pat. Off. |
| 8251172 | 12/1985 | Japan. |
| 2-123671 | 5/1990 | Japan | H01M 10/39 |
| 1558305 | 12/1979 | United Kingdom. |

OTHER PUBLICATIONS

Ceramic Bulletin, vol. 58, No. 5 (1979), "A Prepilot Process for the Fabrication of Polycrystalline β"-Alumina Electrolyte Tubing, pp. 522–526.

Stevens et al., Journal of Materials Science, V. 19, pp. 695–715 (1984) "Review, Structure, Properties and Production of Beta–Alumina".

*Primary Examiner*—Stephen Kalafut
*Attorney, Agent, or Firm*—Parkhurst, Wendel & Burr

[57] ABSTRACT

A magnesia-based beta alumina sintered body having the following features:

(1) the average crystalline particle diameter of beta alumina crystals as calculated assuming that the beta alumina crystals are of a circular section is in a range of 1–4 μm;

(2) the amount of the beta alumina crystals having particle diameters not more than 5 μm is 85% to 98% when measured in a plane;

(3) the maximum crystalline particle diameter is not more than 300 μm, and the number of coarse particles having diameters falling in a range of 100 μm to 300 μm is not more than 1 as counted in an area of 10 mm×10 mm; and (4) the content of crystals of sodium aluminate is 0.5 wt % to 6.0 wt %. A process for producing such a magnesia-based beta alumina sintered body is also disclosed.

12 Claims, 3 Drawing Sheets

FIG_2
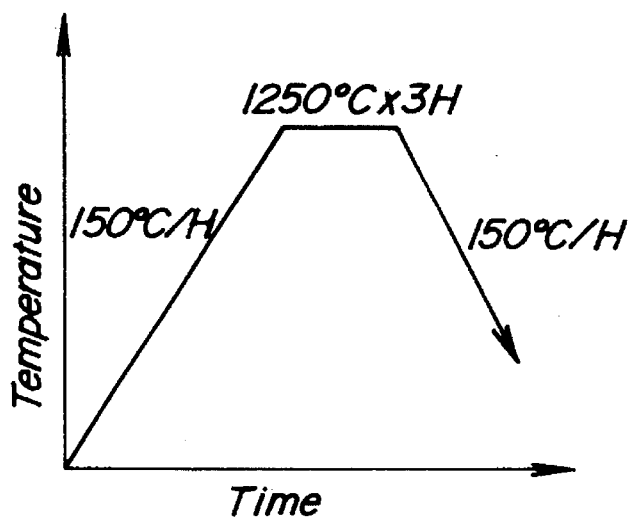
FIG_3
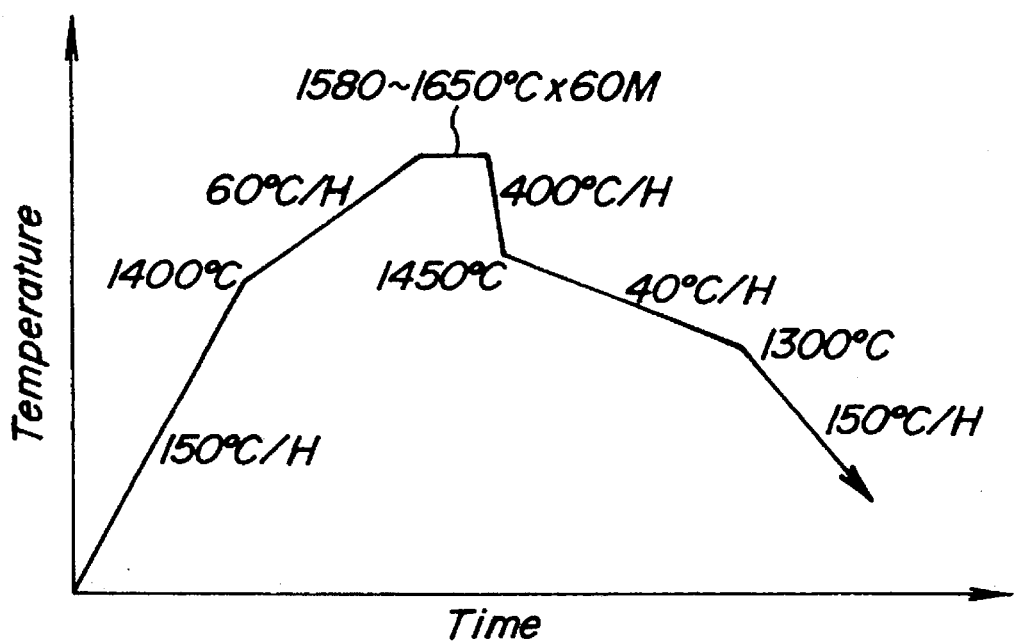

FIG._4
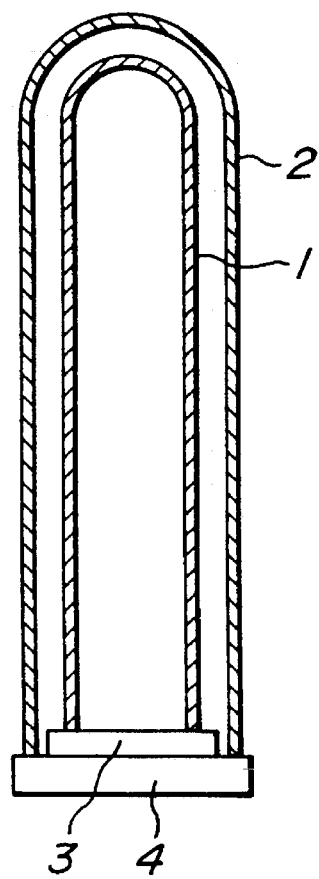
FIG._5
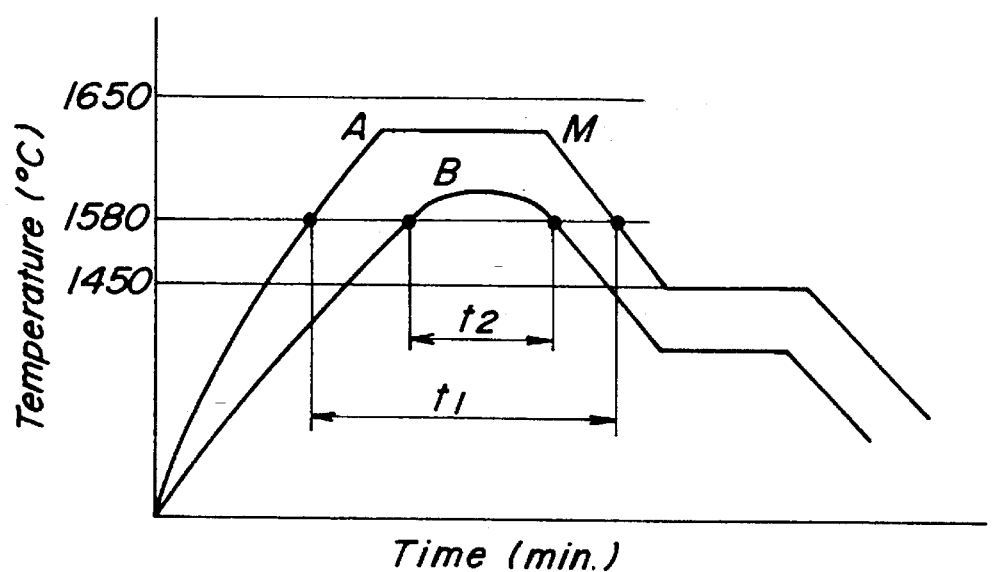

MAGNESIA-BASED BETA ALUMINA SINTERED BODIES AND A PROCESS FOR PRODUCING THE SAME

This application is CIP application of Ser. No. 08/247,460 filed May 23, 1994, which is a continuation application of Ser. No. 07/925,857 filed Aug. 7, 1992, both now abandoned.

BACKGROUND OF THE INVENTION

1. Field of the Invention

The present invention relates to magnesia-based beta alumina sintered bodies and a process for producing the same. Such a magnesia-based beta alumina sintered body is utilized as a solid electrolyte to be used in sodium-sulfur cells.

The beta alumina has four kinds of crystal systems: β-alumina, β"-alumina, β'"-alumina, and β""-alumina. β-Alumina and β"-alumina are mainly precipitated by ordinary producing processes. In the specification and claims of this application, the beta alumina sintered body is composed mainly of β-alumina and β"-alumina. The term of the "magnesia-based" beta alumina sintered body means a beta alumina sintered body in which magnesia is used as a stabilizer.

2. Related Art Statement

The beta alumina sintered bodies have been heretofore used as the solid electrolytes of the sodium-sulfur cells. From the standpoint of performance, service life and operation reliability of the cell, the solid electrolyte is required to have large mechanical strength and low electric resistance.

It has been formerly known that beta alumina having high strength and low electric resistance can be obtained by controlling the contents, ratios and crystalline particle diameters of β-alumina crystals and β"-alumina crystals. For example, "Journals of MATERIALS Science 19 (1984), pp 695–715" describes that the electric resistance varies with the ratios of the β-alumina crystals and β"-alumina crystals, and that the larger the β"-alumina, the lower is the electric resistance (See p 703, FIG. 12).

GB-B-1558305 discloses a process for producing a beta alumina sintered body having high electric conductivity, a fine crystalline structure and high durability. In this patent, having noted that it is difficult to obtain a uniform crystalline structure having high electric conductivity due to densification occurring in a single heating/cooling cycle when firing is effected along a single heating/cooling curve as done conventionally, a beta alumina sintered body having high electric conductivity and a uniform crystalline structure is obtained by repeating heating/cooling twice or more such that not more than 95% of the overall linear shrinkage takes place during any one cycle of heating/cooling.

Further, U.S.P. discloses a process for producing a beta alumina sintered body having high strength and low electric resistance. In this pores, special starting compounds composed alumina, a sodium compound and a lithium-aluminum compound ($Li_2O \cdot nAl_2O_3$) are used, and a beta alumina sintered body is obtained by firing at 1500°–1600° C. for a short time period such as less than 10 minutes.

However, the above Journals of MATERIALS Science discloses a process for producing the beta alumina sintered body having low electric resistance, but has no mentioning about a process for producing a beta alumina sintered body having low resistance and high strength.

On the other hand, the two-stage peak firing process in GB-B-1558305 has various problems in practical application. That is, while the temperature distribution widely varies inside a large-scale furnace for mass production, it is necessary to extremely sharply vary the temperature distribution inside the furnace so that heating/cooling may be repeated along a given heat curve with the lapse of time. However, it is difficult to control the temperature distribution inside the furnace in such a manner particularly in the case of the mass production type large-scale furnace. As a result, it was extremely difficult to mass produce products having less variation in quality at a high yield.

On the other hand, U.S. Pat. No. 4,113,928 describes the process for producing the lithia-based beta alumina sintered bodies, but does not specifically disclose anything about a process for producing magnesia-based beta alumina. In this process for producing the lithia-based beta alumina sintered bodies, the firing is effected at 1500°–1600° C., and the molded body is kept at this firing temperature for an extremely short period, e.g., less than 10 minutes. Therefore, this process has also various problems in the practical application. That is, since the temperature distribution widely varies in the large-scale furnace for mass production, it takes a long time to make a temperature in a lower temperature zone follow that in a higher temperature zone. Therefore, the short firing temperature requires that even a large-scale furnace has an extremely excellent temperature distribution. However, it is difficult to produce such a large-scale furnace.

Therefore, the above processes are inappropriate as a producing process for the mass production of the beta alumina sintered bodies.

SUMMARY OF THE INVENTION

The present invention is aimed at the provision of a magnesia-based beta alumina sintered body having both high strength and low electric resistance as well as a producing process suitable for the mass production of such sintered bodies.

Conventionally, there is a problem that if high strength is to be obtained, electric resistance becomes larger, whereas if the electric resistance is to be reduced, strength decreases. The present invention is based on the knowledge that sintered bodies having high strength and small electric resistance can be obtained by employing a magnesia-based beta alumina system and making it sintered bodies have a specific microstructure. The present inventor has found that the producing condition suitable for the mass production of the beta-alumina sintered bodies having such a specific microstructure is that ① a heat curve in the firing step is simple, that is, the firing is effected in a single cycle of heating/cooling with a single temperature peak, ② the firing temperature is low and the acceptable width of the firing temperature zone is wide, and ③ the firing time needs to be neither extremely short nor extremely long. The present invention is based on the knowledge that such a producing process suitable for the mass production can be realized by appropriately setting the composition of the beta-alumina sintered body, an allowable diameter range of coarse particles and their existing amount and a cooling condition from the firing temperature.

In order to realize the above object, the magnesia-based beta alumina sintered body according to the present invention has the following features:

(1) the average crystalline particle diameter of beta alumina crystals as calculated assuming that the beta alumina crystals are of a circular section is in a range of 1–4 μm;

(2) the amount of the beta alumina crystals having particle diameters not more than 5 μm is 85% to 98% when measured in a plane;

(3) the maximum crystalline particle diameter is not more than 300 μm, and the number of coarse particles having diameters falling in a range of 100 μm to 300 μm is not more than 1 as counted in an area of 10 mm×10 mm; and (4) the content of crystals of sodium aluminate is 0.5 wt % to 6.0 wt %.

Further, the process for producing a magnesia-based beta alumina sintered body according to the present invention involves the steps of: weighing and mixing spinel, alumina and a sodium compound as starting materials in such respective amounts that the resulting magnesia-based beta alumina sintered body may be composed of 85.5 to 87.5 wt % of $Al_2O_3$, 3.5 to 4.5 wt % of MgO and 9.0 to 10.0 wt % of $Na_2O$; obtaining calcined beta alumina by calcining the resulting mixture; milling and granulating the calcined beta alumina; molding the granulated product; firing the molded product, wherein the firing temperature is set at 1580°–1650° C., the molded product is fired while being kept at this firing temperature for a time period from 30 minutes to 60 minutes, and the fired product is rapidly cooled in a temperature range from a maximum firing temperature to 1,450° C. by setting a cooling rate at 300° C./hr to 800° C./hr.

In the present invention, the microstructure is so controlled that the average crystalline particle diameter of beta-alumina crystals as calculated assuming that the beta alumina crystals are of a circular section may be in a range of 1–4μ. The average particle diameter is unfavorably less than 1 μm, because in such a case electric resistance increases although no problem occurs with strength. If the average particle diameter is more than 4 μm, strength decreases. Further, the particle size distribution is so controlled that the ratio of the beta alumina crystals having particle diameters of not more than 5 μm may be 85% to 98% when measured in a plane. If the the ration of the beta alumina crystals having particle diameters of not more than 5 μm is less 85%, strength decreases. On the other hand, if this ratio is more than 98%, electric resistance unfavorably increases.

Furthermore, when a large particle having particle diameters more than 300 μm exists in the tissue of the sintered body, cracking proceeds from such a coarse particle as a starting point so that the sintered body may be likely to be broken. Moreover when the number of coarse particles having diameters falling in a range of 10 to 300 μm is not more than 1 as counted in an area of 10 mm×10 mm on the average, the beta alumina sintered body can exhibit high diametral pressure strength of not less than 250 MPa.

It is ideal that no coarse particles exist in the sintered body. However, even if fine raw material are uniformly mixed, a locally non-uniform distribution of an alkaline component, which is considered to be caused by granulating, cannot be actually avoided. As a result, coarse particles having sizes forming gaps between surrounding particles exists. Existence of a few to several particles smaller than 100 μm does not largely influence strength, but coarse particles greater than 100 μm give large influence upon strength. Thus, controlling must be so made that substantially no coarse particles greater than 300 μm may be produced.

Furthermore, it is important to make controlling such that the content of crystals of sodium aluminate remaining in the sintered body may be 0.5 wt % to 6.0 wt %. It is preferable to formulate the starting mixture so that the crystals of sodium aluminate may remain in the sintered body, because electric resistance of the sintered body is small in this case. This is considered that the crystals of sodium aluminate precipitate in a temperature range of 800°–900° C. during the firing step, the precipitated sodium aluminate crystals are converted to β"-alumina through reaction with β-alumina at temperature not less than 1,400° C. to increase the ratio of β"-alumina, and consequently electric resistance of the sintered body decreases. If the residual amount of the crystals of sodium aluminate is less than 0.5%, the entire sintered body cannot be appropriately uniformly converted to β"-alumina. Thus, the residual amount of less than 0.5% is not preferred. On the other hand, the residual amount of more than 6% is not preferred, because strength of the sintered body decreases and electric resistance increases in this case.

The following are preferred as the magnesia-based alumina sintered body according to the present invention.

(1) The content of $ZrO_2$ is 0.1 wt % to 3.0 wt % relative to the total weight of the sintered body.

(2) The magnesia-based alumina sintered body has a diametrical compression strength of not less than 250 MPa, and a four-terminal electric resistance of not more than 5 Ωcm on at 350° C.

The following are preferred as the producing process of the present invention.

(1) The starting materials are mixed in such respective amounts that residual crystals of sodium aluminate may be 0.5 to 6.0 wt % relative to the total weight of the magnesia-based beta alumina sintered body.

(2) When the starting materials are mixed, $ZrO_2$ is so added that the content of $ZrO_2$ may be in a range of 0.1 to 3.0 wt % relative to the total weight of the sintered body.

(3) The sintered body has a diametrical compression strength of not less than 250 MPa, and a four-terminal electric resistance of not more than 5 Ωcm on at 350° C.

(4) The firing temperature is 1,600–1,630° C.

(5) The cooling rate in the range from the maximum firing time to 1,450° C. is 400–500° C./hr.

(6) The content of sodium aluminate remaining in the resulting beta alumina sintered body is 3–5 wt. %.

(7) The addition amount of $ZrO_2$ 0.1–0.5 wt %.

The above (6) and (7) are preferable in the case of the magnesia-based alumina sintered body.

The following is another aspect of the producing process of the present invention.

A process for producing a magnesia-based beta alumina sintered bodies, includes the steps of: weighing and mixing spinel, alumina and a sodium compound as starting materials in such respective amounts that the resulting magnesia-based beta alumina sintered body may be composed of 85.5 to 87.5 wt % of $Al_2O_3$, 3.5 to 4.5 wt % of MgO and 9.0 to 10.0 wt % of $Na_2O$; obtaining calcined beta alumina by calcining the resulting mixture; milling and granulating the calcined beta alumina; molding the granulated products; and firing the molded products, wherein the firing temperature at which the molded products are fired on a low temperature side in a firing furnace is set at not less than 1580° C., while the molded product being kept at the firing temperature for a time period not less than 30 minutes, whereas the firing temperature at which the molded products are fired on a higher temperature side in the firing furnace is set at not more than 1650° C., while the molded product is fired while being held at the firing temperature for a time period of not more than 60 minutes, and the fired products are rapidly cooled in a temperature range from a maximum firing temperature to 1,450° C. by setting a cooling rate at 300° C./hr to 800° C./hr.

These and other objects, features and advantages of the invention will be appreciated upon reading the following description of the invention when taken in conjunction with the attached drawings, with the understanding that some modifications, changes and variations could be made by the skilled person in the art to which the invention pertain.

BRIEF DESCRIPTION OF THE DRAWINGS

For a better understanding of the invention, reference is made to the attached drawings, wherein:

FIG. 2 shows a calcining curve along which is calcined spinel as a starting material for magnesia-based beta alumina sintered body according to the present invention;

FIG. 3 is an example of a heat curve along which the magnesia-based sintered body is produced by firing;

FIG. 4 is a firing vessel for producing the magnesia-based beta alumina sintered body according to the present invention; and FIG. 5 is a diagram illustrating a firing condition in a mass-production type large scale furnace in a process for producing the magnesia-based beta alumina sintered body according to the present invention.

DESCRIPTION OF THE PREFERRED EMBODIMENT

Figure 1:
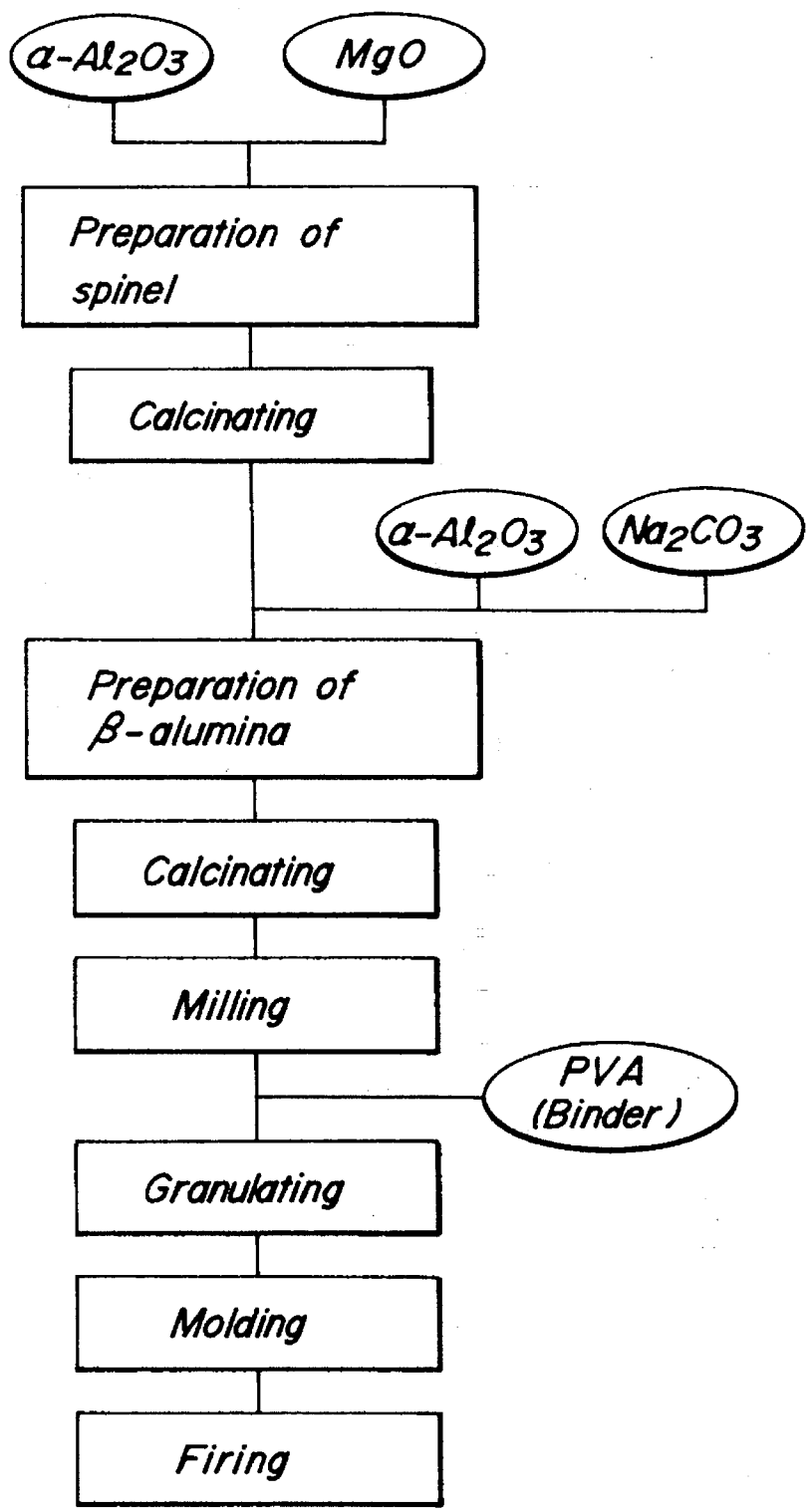
FIG. 1 is a flow chart illustrating a process for producing a magnesia-based beta alumina sintered body according to the present invention.

The producing process of the present invention suitable for the mass production of the magnesia-based beta alumina sintered body having the above micro-structure will be explained. First, the producing steps of this process will be explained along those shown in FIG. 1.

(1) Production of spinel

In order to first produce spinel, alumina and magnesia are mixed at molar ratios of 1:1, and the resulting mixture is calcined along a spinel-calcining curve shown in FIG. 2, thereby producing spinel.

(2) Production of calcined beta alumina

The thus obtained spinel, alumina and a sodium compound (e.g., sodium carbonate) are weighed and mixed ratios as starting materials at given ratios, and the mixture is milled to obtain a raw material for beta alumina. The raw material is dried and calcined to produce a calcined beta alumina raw material. Each of the starting materials used is preliminarily milled to a fine powder having the diameters of not more than 1 μm. The starting materials are formulated in such mixing ratios that the composition of the beta alumina sintered body may be 85.5 to 87.5 wt % of $Al_2O_3$, 3.5–4.5 wt % of MgO and 9–10.0 wt % of $Na_2$).

(3) Milling, granulating and molding

The thus calcined beta alumina is milled, and a binder such as polyvinyl alcohol is mixed into the milled product. The resulting mixture is granulated with a spray dryer. The granulated material as a molding material is press molded in a bottomed tubular form by cold static ISO press.

(4) Firing

As shown in FIG. 5, a bottomed tubular molding thus molded is set in a container made of sense magnesia having high purity, which is placed in a furnace. The molding is fired along a heat curve in FIG. 3. The firing is effected under the condition that the firing temperature is set at 1580°–1650° C., and the keeping time at the firing temperature is 30–60 minutes, and the cooling rate in a temperature range from the maximum firing temperature to 1450° C. is 300° to 800°/hr.

The producing process of the present invention will be further explained in detail along the above-mentioned steps.

The reason why MgO is used as a stabilizer is that the firing temperature range can be made wider, and the sintered bodies having stabilized physical properties can be obtained in the large-scale furnace even if the temperature distribution is slightly bad in the furnace. The reason why spinel obtained by reacting MgO with alumina is used as a starting material is that a small addition amount of MgO is uniformly mixed to prevent local deviation in mixing. By so doining, the formation of coarse particles can be suppressed. The reason why the above-mentioned starting materials are mixed at the above ratios is that 0.5 to 6.0 wt % of the crystals of sodium aluminate is retained in the beta alumina sintered body. Thereby, the ratio of β" in the sintered body increases to lower electric resistance. Since each of the starting materials is milled to not more than 1 μm, they are homogeneously mixed to make the microstructure of the sintered body homogeneous and fine. That is, strength of the sintered body increases. The reason why the calcined beta alumina is preliminarily produced is that if the above starting materials are directly subjected to granulation, molding and firing, while omitting the calcining step, it is likely that the sintered body has an extremely large shrinkage factor and contains an interior defect such as a crack. It is preferable that 0.1 to 3.0 wt % of $ZrO_2$ is added relative to the total weight of the sintered body in the above step (2), because coarse particles are unlikely to be formed due to the action of $ZrO_2$. Accordingly, the sintering time can be advantageously prolonged. If the addition amount $ZrO_2$ is less than 1 wt %, the above effect is small. If it is more than 3.0 wt %, electric resistance exceeds 5.0 Ωcm (at 350° C.). Thus, less than 0.1 wt % and more than 3 wt % are not preferable when $ZrO_2$ is added. The reason why the cooling rate in the temperature range from the maximum firing temperature to 1450° C. is set at 300°–800° C./hr in the step (4) is that since the crystals of beta alumina are being formed at the firing temperature and the particle growth is occurring and since the average particle diameter of the beta alumina crystals is controlled to 1–4 μm under the firing condition given in the step (4), the growth of the crystals is stopped in this state by rapidly cooling so as to control the microstructure. It is inpreferable that the cooling is effected more slowly than at 300° C./hr, because the crystal growth proceeds to disable control of the particle size distribution. On the other hand, if is inpreferable that the cooling is effected at a speed faster than 800° C./hr, because the sintered body and the magnesia container are damaged by thermal impact. The reason why the number of coarse particles being 100 μm to 300 μm is not more than 1 as measured in an area of 10×10 mm is that it was found out that influence upon strength of the sintered body is small and acceptable. As a result, the firing temperature-keeping time can be prolonged, and the firing temperature range can be made wider.

The variations in the furnace-interior temperature distribution cannot be avoided in the case of the mass-production type large-scale furnace. As shown in FIG. 5, the molded body located at the heat curve A on a higher temperature zone in the furnace is fired in a temperature range not less than 1580° C. for a $t_1$ minutes. On the other hand, the molded body located at the heat curve B on a lower temperature zone in the furnace is fired in a temperature range not less than 1580° C. for a $t_2$ minutes. The molded body located on the higher temperature zone and that on the lower temperature zone need to acquire strength 250 MPa or more and electric resistance of 5 Ωcm or less (at 350° C.) as the physical properties of the sintered body.

The longer the acceptable firing time $t_1$ and the shorter the minimum necessary firing time $T_2$, the advantageous are the results for the mass production. In the present invention, the firing time $t_1$ and the minimum necessary firing time $t_2$ are 60 minutes and 30 minutes, respectively. As to the firing temperature, the lower the acceptable firing temperature and the wider the firing temperature range, the advantageous are the results for the mass production. In the present invention, the firing temperature is in a range of 1580°–1650° C. The reason why the cooling rate from the maximum firing temperature M is important is that since the grain growth at this maximum firing temperature is most active, it is difficult to control the particle size unless redid cooling is effected from the maximum temperature.

The reason why the acceptable firing temperature can be increased to 60 minutes and the acceptable firing temperature can be set in a wide range of 1580°–1600° C. in the production of the sintered body of the present invention through firing, which sintered body has the microstructure, the combination of the following factors. That is, ① the formation of abnormal crystals is suppressed, more specifically, the local deviation of the MgO is prevented by using MgO in the form of spinel as a starting material, and the starting materials are as fine as not more than 1 μm; ② the cooling rate is set at an extremely high value of 300°–800° C./hr in a range of the maximum firing temperature to 1450° C.; ③ the existence of the coarse particles up to 300 μm can be allowed; ④ MgO is used as a stabilizer; and ⑤ beta alumina is calcined, and then molded and fired. The firing condition suitable for the mass production is attained by the above factors ① through ⑤. In addition, ⑥ the formation of the coarse particles are preferably further prevented by adding 0.1–3.0 wt % of $ZrO_2$ is added to the starting materials. Moreover, besides the above factors, when the composition of the sintered body is so set that the content of the crystals of sodium aluminate remaining in the sintered body may be 0.5–6.0 wt %, the sintered body having the microcrystals with a high percentage of β"-alumina and low electric resistance can be obtained. Therefore, the magnesia-based beta alumina sintered body having high strength and low electric resistance can be obtained by the producing process suitable for the mass production.

(Experiment)

In the following, a specific example of the process for producing the magnesia-based alumina sintered body according to the present invention will be described.

(1) Production of spinel

α-Alumina and magnesia were so weighed and mixed that the total mixed weight might be 50 kg and α-alumina and magnesia might be 1:1 in terms of molar ratio. In a trommel charged with grinding media and lined with α-alumina having a high purity of 99.7 wt %, water was so added to the resulting mixture that the content of the water might be 65 w %. Then, the mixture was mixed for 6 hours. The resulting mixture was dried in an electric dryer at 120° C. for 6 hours. Then, the dried mixture was fused and crushed in a granular form smaller than about 5 mm, which was charged into a sheath made of α-alumina with a high purity of 99.9 wt %, and calcined in the electric furnace along the spinel-calcining curve in FIG. 2. Thereby, spinel was produced. The calcined product was analyzed by an X-ray quantitative diffraction analyzer, which revealed that the calcined product was composed of 100% spinel.

(2) Production of calcined beta alumina

The thus obtained spinel, α-alumina and sodium carbonate were so weighed as starting materials that the total starting materials might be 50 kg and the composition of the resulting beta alumina sintered body might be 87.5 wt % of $Al_2O_3$, 3.5 wt % of MgO and 9.0 wt % of $Na_2O$. Then, water was so added into the resulting mixture inside the trommel charged with grinding media and lined with α-alumina having high purity 99.7 wt % that the content of water might be 65 wt %. The resulting mixture was mixed and milled to prepare a raw material for beta alumina. The average particle diameter of the beta alumina raw material was measured to be 0.8 μm by using a laser type particle size distribution meter. A slurry of the alumina raw material was poured into a spray dryer with an inlet temperature of 180° C., thereby obtaining a granulated powder having the water content of 2.0 wt %. The granulated powder was charged into a sheath made of alumina with a high purity of 99.0 wt %, and calcined along the calcining heat curve of FIG. 2 in the electric furnace at a calcining temperature of 1250° C. for a calcining time of 3 hours. Thereby, calcined beta alumina was produced. The heat curve in FIG. 2 is also applicable to the production of spinel as well as to the production of the calcined beta alumina product.

(3) Milling, granulating and molding

Into the above-calcined beta alumina was so added water inside the trommel charged with grinding media made of α-alumina with high purity of 99.7 wt % and lined with α-alumina having the same purity that the content of water might e 50 wt %. The resulting mixture was milled for 6 hours, which was added with 2.0 wt % of polyvinyl alcohol (PVA) as a molding aid. Then, the mixture was mixed for 15 minutes. A slurry of the resultant mixture was granulated in the spray dryer with the inlet temperature of 190° C. The thus granulated powder had the average particle diameter of 75 μm and the water content of 2.2 wt %.

The above granulated powder was molded in the form of a tube having an outer diameter of 30 mm, an entire length of 280 mm and a thickness of 2.5 mm with one end closed under molding pressure of 1.5 tons by using a dry back type static pressure molding machine.

(4) Firing

The molded tube 1 was fired by using a firing container 2 made of magnesia as shown in FIG. 4. In this figure, 3 is a green setter made of beta alumina, and 4 is a firing table. The reason why the tube was fired in the firing container 2 is that scattering of sodium in beta alumina might be prevented. The tube 1 was fired along the heat curve shown in FIG. 3. The heat curve in FIG. 3 is a firing condition under which the diametral compression strength and the four-terminal electric resistance of the resulting sintered body might be not less than 250 MPa and not more than 5.0 Ωcm at 350° C., respectively.

(Examples 1–5 and Comparative Examples 6 and 7)

The starting materials and the producing condition given in the above experiment were employed, and firing was effected at various firing temperatures shown in the following Table 1. Thereby, magnesia-based beta alumina sintered bodies in Examples 1 through 7 were obtained. Examples 1 through 7 were produced under the same condition except that 1.0 wt % of $ZrO_2$ was added relative to the entire weight of the sintered body in Example 7. Example 6 is considered best among the sintered bodies added with no ZrO$_2$. In Example 7, the growth of coarse particles was suppressed by the addition of ZrO$_2$ to make the maximum crystal particle diameter smaller. Example 7 is considered best among those added with ZrO$_2$.

ing step, thereby lowing the diametrical compression strength. Comparative Example 12 is a case where the firing temperature was more than 1650° C. In this case, the crystal growth extremely rapidly proceeded to make crystal coarse. Consequently, the diametrical compression strength

TABLE 1

|  |  | Examples | | | | | | | Comparative Examples | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| ① | Firing temperature (°C.) | 1,580 | 1,600 | 1,620 | 1,650 | 1,650 | 1,620 | 1,610 | 1,560 | 1,580 | 1,650 | 1,650 | 1,670 |
| ② | Firing time (min.) | 30 | 40 | 50 | 60 | 60 | 60 | 60 | 30 | 20 | 70 | 60 | 60 |
| ③ | Cooling rate (°C./hr) Ti → 1450° C. | 300 | 500 | 700 | 800 | 300 | 500 | 500 | 300 | 300 | 800 | 250 | 800 |
| ④ | Average crystal particle diameter (μm) | 1.0 | 1.4 | 1.7 | 3.0 | 4.0 | 1.8 | 1.5 | 0.7 | 0.8 | 4.3 | 4.2 | 7.0 |
| ⑤ | Percentage of crystalline particle smaller than 5 μm (%) | 98 | 97 | 93 | 90 | 87 | 94 | 95 | 99 | 99 | 85 | 84 | 80 |
| ⑥ | Maximum crystal particle diameter (μm) | 40 | 60 | 110 | 200 | 300 | 115 | 70 | 20 | 30 | 350 | 360 | 400 |
| ⑦ | Diametral compression strength (MPa) | 270 | 280 | 320 | 305 | 250 | 330 | 350 | 215 | 230 | 200 | 205 | 180 |
| ⑧ | Four-terminal electric resistance (Ω-cm at 350° C.) | 5.0 | 4.8 | 4.7 | 4.7 | 4.5 | 4.7 | 4.7 | 6.0 | 6.0 | 4.3 | 4.2 | 4.5 |
| ⑨ | Amount of β"-alumina crystals (wt %) | 92.1 | 93.2 | 94.5 | 95.5 | 95.8 | 94.0 | 93.8 | 90.2 | 91.5 | 96.3 | 96.3 | 95.8 |
| ⑩ | Amount of sodium aluminate crystals (wt %) | 5.0 | 4.8 | 4.5 | 4.1 | 4.0 | 4.5 | 4.7 | 5.2 | 5.3 | 3.7 | 3.8 | 3.7 |
| 11 | Addition amount of ZrO$_2$ (wt %) | not added | not added | not added | not added | not added | not added | 1.0 | not added | not added | not added | not added | not added |

Note: Ti — Maximum firing temperature

As is seen in Table 1, the magnesia-based alumina sintered bodies in Examples 1 through 7 realized the diametral compression strength and the four-terminal electric resistance aimed at by the present invention. On the other hand, when the firing was effected at less than the firing temperature range of the present invention as in Comparative Example 8, the crystal growth can be suppressed to make the maximum crystal diameter smaller. To the contrary, high strength is not obtained due to insufficient sintering, and electric resistance increases due to insufficient conversion to β"-alumina. Further, as in Comparative Example 9, if the firing temperature falls within the range of the present invention and if the firing time is as short as less than 30 minutes, since the sintering is insufficient, high strength is not obtained and electric resistance increases. That is, in order to realize the diametrical compression strength and the four-terminal electric resistance aimed at by the present invention, the minimum necessary firing temperature and the fixing time are 1580° C. and 30 minutes, respectively. Comparative Example 10 is a case where the firing temperature was 1650° C. and the firing time was more than 60 minutes. In this case, the crystal growth proceeds, the average particle diameter increases, the maximum crystal particle diameter also increases, and the diametrical compression strength decreases. In Comparative Example 11, the firing temperature was 1650° C. and the firing time was 60 minutes, which fall within the scope of the present invention. However, in Comparative Example 11, the sintered body was slowly cooled at a cooling rate of 250° C./hr in the range of 1650°–1450° C. In this case, the crystal growth and the crystal-coarsing proceeded during the cooling step, thereby lowing the diametrical compression strength. Comparative Example 12 is a case where the firing temperature was more than 1650° C. In this case, the crystal growth extremely rapidly proceeded to make crystal coarse. Consequently, the diametrical compression strength decreases. That is, the acceptable firing temperature is not more than 1650° C. and the acceptable firing time is not more than 60 minutes, and the acceptable cooling rate in the temperature range Of 1650°–1450° C. is not less than 300° C./hr.

The physical properties of the magnesia-based alumina sintered bodies in Examples and Comparative Examples were measured as follows:

(1) Measurement of the particle diameter of the β-alumina crystals and β"-alumina crystals:

A section of the beta alumina tube was mirror polished, and etched with hot phosphoric acid. Then, the thus etched surface was observed with a scanning type electron microscope, and the particle diameter was measured with respect to an obtained microstructure photograph by using an image analyzer.

(2) Diametrical compression strength:

A loop having a length of 10 mm was cut from the beta alumina tube, and compressed in a radial direction of the cut loop at a cross head speed of 0.5 mm/min. by using an autograph manufactured by Shimazu Manufacturing Co., Ltd. The diametrical compression strength was calculated from a broken value.

(3) Four-terminal electric resistance:

A sample piece having a size of 2×2×40 mm was prepared form the beta alumina tube. Opposite ends of the sample piece were coated with carbon, and connected together via a platinum wire. Electric resistance in an axial direction of the sample piece was measured at an elevated temperature of 350° C.

(4) Analysis of components:

The amount of β"-alumina crystals and that of the crystals of sodium aluminate were quantitatively analyzed by using a powder X-ray diffracting analyzer.

As shown in the results in FIG. 1, the magnesia-based beta alumina sintered bodies according to the present invention can satisfy high strength (the diametrical compression strength of 250–350 MPa) and low electric resistance (the four-terminal electric resistance of 4.5–5.0 Ωcm (at 350° C.)). To the contrary, it is seen that Comparative Examples 8 through 12 exhibit low strength and/or high electric resistance. The acceptable firing temperature range can be made wider by taking the maximum crystal diameter as not more than 300 μm to sufficiently cope with the mass production.

What is claimed is:

1. A magnesia-based beta alumina sintered body, comprising beta alumina crystals and sodium aluminate crystals, wherein:

(1) the average crystalline particle diameter of beta alumina crystals, calculated assuming that the beta alumina crystals are of a circular cross-section, is in a range of 1–4 μm;

(2) the amount of beta alumina crystals having particle diameters not more than 5 μm, when measured in a cross-sectional area of the sintered body, is 85% to 98%;

(3) the maximum crystalline particle diameter is not more than 300 μm;

(4) the number of coarse particles having diameters falling in a range of 100 μm to 300 μm is not more than 1, when counted in a 10 mm×10 mm cross-sectional area of the sintered body; and (5) the content of crystals of sodium aluminate is 0.5 wt % to 6.0 wt %.

2. The magnesia-based beta alumina sintered body according to claim 1, further comprising 0.1 wt % to 3.0 wt % $ZrO_2$ relative to the total weight of the sintered body.

3. The magnesia-based beta alumina sintered body according to claim 1, which has a diametrical compression strength of not less than 250 MPa, and a four-terminal electric resistance of not more than 5 Ωcm at 350° C.

4. A process for producing a magnesia-based beta alumina sintered body, comprising the steps of:

weighing and mixing $MgOAl_2O_3$ spinel, alumina and a sodium compound as starting materials in such respective amounts that the resulting magnesia-based beta alumina sintered body is composed of 85.5 to 87.5 wt % of $Al_2O_3$, 3.5 to 4.5 wt % of MgO and 9.0 to 10.0 wt % of $Na_2O$;

calcining the resulting mixture to form calcined beta alumina;

milling and granulating the calcined beta alumina;

molding the granulated beta alumina;

firing the molded beta alumina at 1580°–1600° C. for a time period from 30 minutes to 60 minutes; and cooling the fired beta alumina in a temperature range from a maximum firing temperature to 1,450° C. at a cooling rate of 300° C./hr to 800° C./hr.

5. The process according to claim 4, wherein the starting materials are mixed in such respective amounts that residual crystals of sodium aluminate are present in an amount of 0.5 to 6.0 wt % relative to the total weight of the magnesia-based beta alumina sintered body.

6. The process according to claim 4, wherein when the starting materials are mixed, $ZrO_2$ is so added that the content of $ZrO_2$ is in a range of 0.1 to 3.0 wt % relative to the total weight of the sintered body.

7. The process according to claim 4, wherein the sintered body as a diametrical compression strength of not less than 250 MPa, and a four-terminal electric resistance of not more than 5 Ωcm at 350° C.

8. The process according to claim 6, wherein the sintered body as a diametrical compression strength of not less than 250 MPa, and a four-terminal electric resistance of not more than 5 Ωcm at 350° C.

9. A process for producing a magnesia-based beta alumina sintered body, comprising the steps of:

weighing and mixing $MgOAl_2O_3$ spinel, alumina and a sodium compound as starting materials in such respective amounts that the resulting magnesia-based beta alumina sintered body is composed of 85.5 to 87.5 wt % of $Al_2O_3$, 3.5 to 4.5 wt % of MgO and 9.0 to 10.0 wt % of $Na_2O$;

calcining the resulting mixture to form calcined beta alumina;

milling and granulating the calcined beta alumina;

molding and granulated beta alumina;

firing the molded beta alumina, wherein the firing temperature at which the molded beta alumina is fired on a low temperature side in a firing furnace is set at not less than 1580° C., while the beta alumina is kept at the firing temperature for a time period not less than 30 minutes, whereas the firing temperature at which the beta alumina is fired on a higher temperature side in the firing furnace is set at not more than 1650° C., while the beta alumina is kept at the firing temperature for a time period of not more than 60 minutes; and cooling the fired beta alumina in a temperature range from a maximum firing temperature to 1,450° C. at a cooling rate of 300° C./hr to 800° C./hr.

10. The magnesia-based beta alumina sintered body according to claim 7, which as a diametrical compression strength of not less than 250 MPa, and a four-terminal electric resistance of not more than 5 Ωcm at 350° C.

11. The process according to claim 5, wherein when the starting materials are mixed, $ZrO_2$ is so added that the content of $ZrO_2$ is in a range of 0.1 to 3.0 wt % relative to the total weight of the sintered body.

12. The process according to claim 5, wherein the sintered body as a diametrical compression strength of not less than 250 MPa, and a four-terminal electric resistance of not more than 5 Ωcm at 350° C.

* * * * *